UNITED STATES PATENT OFFICE.

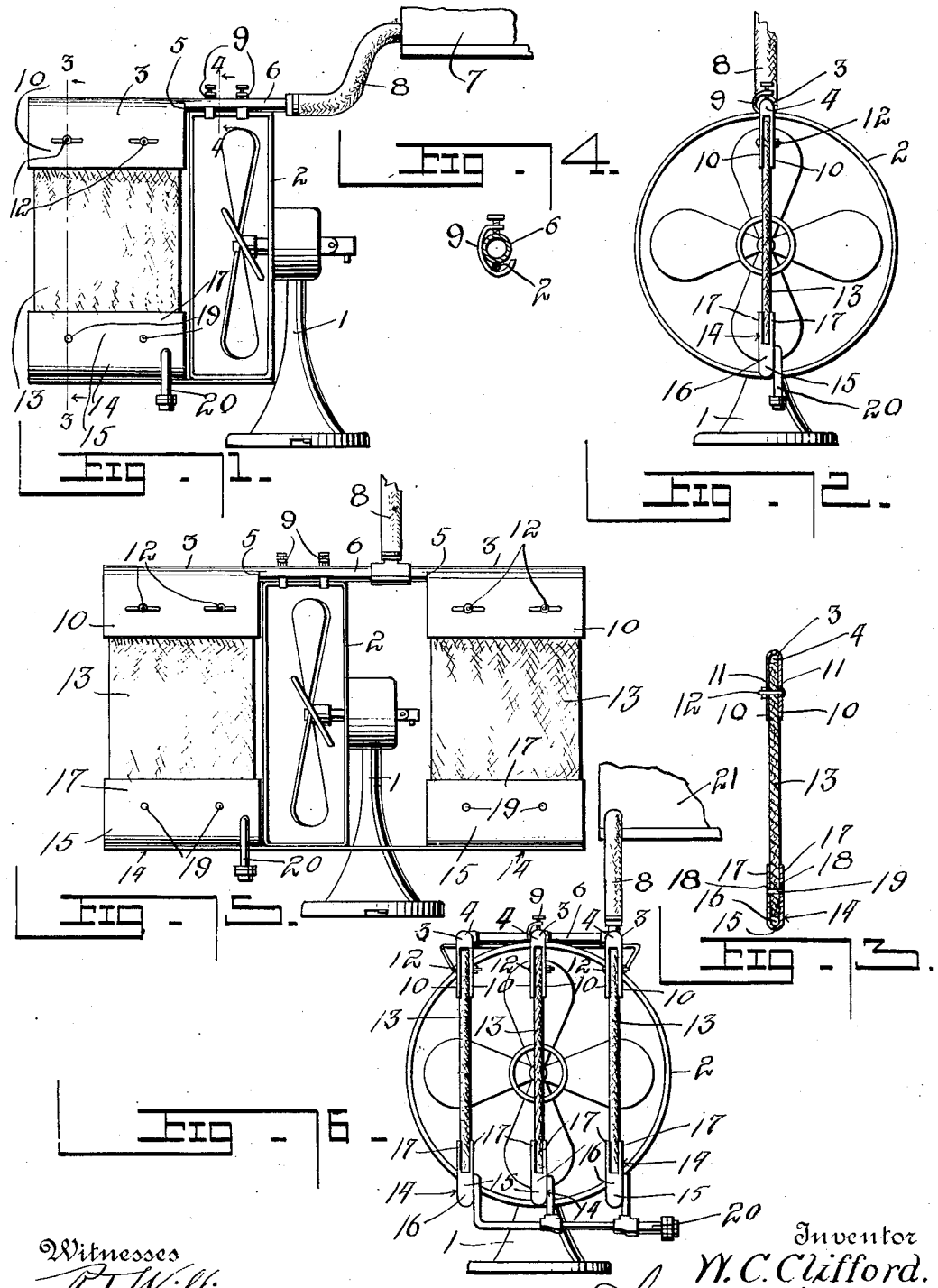

WILLIAM C. CLIFFORD, OF MANNFORD, OKLAHOMA.

HUMIDIFIER.

1,109,567.
Specification of Letters Patent.
Patented Sept. 1, 1914.

Application filed April 24, 1913. Serial No. 763,396.

*To all whom it may concern:*

Be it known that I, WILLIAM C. CLIFFORD, a citizen of the United States, residing at Mannford, in the county of Creek, State of Oklahoma, have invented certain new and useful Improvements in Humidifiers; and I do hereby declare the following to be a full, clear, and exact description of the invention, such as will enable others skilled in the art to which it appertains to make and use the same.

The present invention is directed to improvements in humidifiers.

The invention has for its object to so construct a device of this character that the same may be easily and quickly attached to the fan shield of the ordinary electric fan.

A further object of the invention is to provide a novel form of holder for the wick, the same being provided with means for regulating the flow of liquid thereto.

With these and other objects in view, this invention resides in the novel features of construction, formation, combinations and arrangement of parts to be hereinafter more fully described, claimed and illustrated in the accompanying drawing, in which:—

Figure 1 is a side elevation of the device. Fig. 2 is a front elevation of the same. Fig. 3 is a sectional view on line 3—3 of Fig. 1. Fig. 4 is a similar view on line 4—4 of Fig. 1. Fig. 5 is a side elevation of the device showing the device in place upon the front and rear of the fan shield. Fig. 6 is a front view showing a plurality of devices in place upon the fan shield.

Referring to the drawing, the numeral 1 designates an electric fan of any conventional form, and provided with the usual blade shield 2.

The humidifier comprises a hood 3, which is semi-circular in cross section and has its outer end closed by a plate 4. The inner end of the hood is closed by a plate 5, which has connected thereto the tube 6, which is in communication with a tank 7 through the flexible tube 8. It is obvious that the tank 7 may be supported in any suitable manner so that the same will be in convenient position to the hood 3. The tube 6 is connected to the fan shield by suitable clamps 9, so that the hood 3 will be positioned in front of the fan shield. The sides of the hood 3 terminate in plates 10, which are provided with registered perforations 11 for receiving the clamping bolts 12, said bolts being passed through the absorbent wick 13, which has its upper edge extended into the hood 3. The plates 10 are adapted to flex, upon manipulation of the bolts 12, so as to bear tightly against the wick 13 to regulate the flow of water from the tank therethrough.

A collector 14 is provided, and comprises a trough 15 having the closed ends 16, the sides of said trough terminating in plates 17 which are provided with registered perforations 18 for receiving the bolts 19, said bolts passing through the wick 13, while the lower end thereof engages the trough 15, so that water passing from the wick will gravitate to the trough and may be drained off through the tube 20 to a suitable receptacle.

In Fig. 5 there is shown a humidifier arranged so that the wick thereof will be positioned behind the fan blade so that the suction from the fan will act upon the humidifier, as well as the one mounted in front of the fan.

In Fig. 6 there is shown a plurality of humidifiers mounted both back and front of the fan, the same being supplied with water from a common tank 21.

A detail description of the humidifiers shown in Fig. 5 is not thought necessary as the same are identical in construction to the one shown in Figs. 1 to 4 inclusive.

From the foregoing description it will be seen that a humidifier has been provided which may be placed in a room so as to effectually cool the same by the evaporation of moisture of the wick upon operation of the fan.

What is claimed is:—

1. In a humidifier, the combination with a hood, of a liquid supply tube for the hood, plates carried by the hood, a wick having its upper end engaged in the hood and between the plates, means passable through the plates to contract the same to compress the wick, and a trough connected to the lower end of the wick.

2. In a humidifier, the combination with a hood, of a liquid supply tube for the hood, the sides of said hood terminating in plates, a wick having its upper end engaged in the hood and between the plates, a collector comprising a trough, the sides of which terminate in plates, means passable through the last named plates for holding the collector in engagement with the lower end of the wick, and means passable through the first named plates for moving the same toward or away from each other, thereby regulating the pressure upon the wick, as and for the purpose set forth.

In testimony whereof, I affix my signature, in the presence of two witnesses.

WILLIAM C. CLIFFORD.

Witnesses:
W. E. GAGE,
L. C. CLIFFORD.